United States Patent
Hong et al.

(10) Patent No.: US 10,333,155 B2
(45) Date of Patent: *Jun. 25, 2019

(54) POROUS MEDIUM WITH INCREASED HYDROPHOBICITY AND METHOD OF MANUFACTURING THE SAME

(71) Applicants: Hyundai Motor Company, Seoul (KR); Korea Institute of Science and Technology, Seoul (KR)

(72) Inventors: Bo Ki Hong, Seoul (KR); Sae Hoon Kim, Gyeonggi-Do (KR); Kwang Ryeol Lee, Seoul (KR); Myoung Woon Moon, Seoul (KR)

(73) Assignees: Hyundai Motor Company, Seoul (KR); Korea Institute of Science and Technology, Seoul (KR)

( * ) Notice: Subject to any disclaimer, the term of this patent is extended or adjusted under 35 U.S.C. 154(b) by 631 days.

This patent is subject to a terminal disclaimer.

(21) Appl. No.: 14/581,276

(22) Filed: Dec. 23, 2014

(65) Prior Publication Data

US 2015/0162623 A1 Jun. 11, 2015

Related U.S. Application Data (62) Division of application No. 13/210,670, filed on Aug. 16, 2011, now Pat. No. 8,945,409.

(30) Foreign Application Priority Data

Apr. 29, 2011 (KR) .......................... 10-2011-0040477

(51) Int. Cl.
*H01M 8/0234* (2016.01)
*H01M 8/0239* (2016.01)
(Continued)

(52) U.S. Cl.
CPC ....... *H01M 8/0234* (2013.01); *H01M 8/0239* (2013.01); *H01M 8/0243* (2013.01);
(Continued)

(58) Field of Classification Search
CPC ............ H01M 8/0234; H01M 8/0239; H01M 8/0243; H01M 8/0245; Y10S 977/89; Y10S 977/891; B32B 2307/73; B82Y 40/00

See application file for complete search history.

(56) References Cited

U.S. PATENT DOCUMENTS 8,945,410 B2 * 2/2015 Hong .................. H01M 8/1002 216/13
9,422,191 B2 * 8/2016 Lee ...................... B01D 39/083
(Continued)

FOREIGN PATENT DOCUMENTS

DE 102010020142 A1 12/2010
JP 2004261779 A 9/2004
(Continued)

OTHER PUBLICATIONS

Park, Gu-Gon et al., "Effect of PTFE contents in the gas diffusion media on the performance of PEMFC", Journal of Power Sources, 131 (2004), pp. 182-187.

*Primary Examiner* — Scott R. Walshon
*Assistant Examiner* — Jasper Saberi
(74) *Attorney, Agent, or Firm* — Mintz Levin Cohn Ferris Glovsky and Popeo, P.C.; Peter F. Corless (57) ABSTRACT

The present invention provides a porous medium with increased hydrophobicity and a method of manufacturing the same, in which a micro-nano dual structure is provided by forming nanoprotrusions with a high aspect ratio by performing plasma etching on the surface of a porous medium with a micrometer-scale surface roughness and a hydrophobic thin film is deposited on the surface of the micro-nano dual structure, thus significantly increasing hydrophobicity. When this highly hydrophobic porous medium is used as a gas diffusion layer of a fuel cell, it is possible to efficiently discharge water produced during elec-
(Continued)

trochemical reaction of the fuel cell, thus preventing flooding in the fuel cell. Moreover, it is possible to sufficiently supply reactant gases such as hydrogen and air (oxygen) to a membrane electrode assembly (MEA), thus improving the performance of the fuel cell.

13 Claims, 4 Drawing Sheets (51) Int. Cl.
    *H01M 8/0243*     (2016.01)
    *H01M 8/0245*     (2016.01)
    *H01M 8/04119*     (2016.01)
    *B82Y 40/00*     (2011.01)
    *H01M 8/1018*     (2016.01)

(52) U.S. Cl.
    CPC ..... *H01M 8/0245* (2013.01); *H01M 8/04156* (2013.01); *B32B 2307/73* (2013.01); *B82Y 40/00* (2013.01); *H01M 2008/1095* (2013.01); *Y02E 60/50* (2013.01); *Y02P 70/56* (2015.11); *Y10S 977/778* (2013.01); *Y10S 977/89* (2013.01); *Y10T 428/24372* (2015.01)

(56) References Cited

U.S. PATENT DOCUMENTS

| | | |
|---|---|---|
| 2005/0193800 A1 | 9/2005 | DeBoer et al. |
| 2005/0208366 A1 | 9/2005 | Rohwer et al. |
| 2005/0244644 A1* | 11/2005 | Hampden-Smith ......... B01J 31/1625 428/408 |
| 2007/0003084 A1 | 1/2007 | Huynh et al. |
| 2007/0218344 A1* | 9/2007 | Ji ......... H01M 8/0245 429/465 |
| 2008/0210664 A1 | 9/2008 | Uenishi et al. |
| 2009/0035456 A1* | 2/2009 | Faucheux ......... H01M 8/1023 427/115 |
| 2010/0099005 A1 | 4/2010 | Ren et al. |
| 2010/0102026 A1* | 4/2010 | Lee ......... C23C 16/0263 216/13 |
| 2010/0129696 A1* | 5/2010 | Hong ......... H01M 4/8807 429/439 |
| 2010/0145286 A1 | 6/2010 | Zhang et al. |
| 2010/0152708 A1 | 6/2010 | Li et al. |
| 2010/0314038 A1* | 12/2010 | Tanuma ......... H01M 8/0234 156/249 |
| 2011/0136044 A1 | 6/2011 | Han et al. |
| 2012/0009495 A1 | 1/2012 | Cha et al. |
| 2013/0089807 A1 | 4/2013 | Hong et al. |

FOREIGN PATENT DOCUMENTS

| | | |
|---|---|---|
| KR | 10-2004-0106096 | 12/2004 |
| KR | 10-0977541 | 11/2009 |
| KR | 10-2010-0116043 | 10/2010 |
| KR | 10-2010-0137739 | 12/2010 |
| WO | 97/13287 A2 | 4/1997 |
| WO | 2004/075322 A1 | 9/2004 |

* cited by examiner

POROUS MEDIUM WITH INCREASED HYDROPHOBICITY AND METHOD OF MANUFACTURING THE SAME

CROSS-REFERENCE TO RELATED APPLICATION

This application is a Divisional Application of U.S. patent application Ser. No. 13/210,670, filed Aug. 16, 2011, which claims under 35 U.S.C. § 119(a) the benefit of Korean Patent Application No. 10-2011-0040477 filed Apr. 29, 2011, the entire contents of which are incorporated herein by reference.

BACKGROUND (a) Technical Field

The present invention relates to a hydrophobic porous medium and a method of manufacturing the same. More particularly, it relates to a highly hydrophobic porous medium and a method of manufacturing the same.

(b) Background Art

An electrochemical reaction in a polymer electrolyte membrane fuel cell (PEMFC) for electricity generation is as follows. Hydrogen supplied to an anode ("oxidation electrode") in a membrane electrode assembly (MEA) of the fuel cell is dissociated into hydrogen ions (protons, $H^+$) and electrons ($e^-$). The hydrogen ions are transmitted to a cathode ("reduction electrode") through a polymer electrolyte membrane, and the electrons are transmitted to the cathode through an external circuit such that electricity is generated by the flow of electrons.

Moreover, at the cathode, the oxygen molecules, protons, and electrons react with each other to produce electricity and heat, and at the same time, produce water as a reaction by-product.

The area expressing the electrochemical performance of the fuel cell is generally classified into three regions: (i) an "activation loss" region due to loss of electrochemical reaction kinetics; (ii) an "ohmic loss" region due to contact resistance at interfaces between respective components and loss of ionic conduction in the polymer electrolyte membrane; and (iii) a "mass transport loss" or "concentration loss" region due to the limitations of mass transport of reactant gases [R. O Hayre, S. Cha, W. Colella, F. B. Prinz, Fuel Cell Fundamentals, Ch. 1, John Wiley & Sons, New York (2006)].

When an appropriate amount of water produced during the electrochemical reaction is present, it preferably serves to maintain the humidity of the polymer electrolyte membrane. However, when an excessive amount of water produced is not appropriately removed, "flooding" occurs at high current density, preventing the reactant gases from being efficiently supplied to the fuel cell and thereby increasing voltage loss [M. M. Saleh, T. Okajima, M. Hayase, F. Kitamura, T. Ohsaka, J. Power Sources, 167, 503 (2007)].

A typical porous medium that constitutes the fuel cell is a gas diffusion layer (GDL), which has a structure in which a microporous layer (MPL) and a macroporous substrate or backing are combined together.

Commercially available gas diffusion layers have a duel layer structure including a microporous layer having a pore size of less than 1 micrometer when measured by mercury intrusion and a macroporous substrate or backing having a pore size of 1 to 300 micrometers [X. L. Wang, H. M. Zhang, J. L. Zhang, H. F. Xu, Z. Q. Tian, J. Chen, H. X. Zhong, Y. M. Liang, and B. L. Yi, Electrochimica Acta, 51, 4909 (2006)].

The gas diffusion layer is attached to the outer surface of catalyst layers for the anode and cathode coated on both surfaces of the polymer electrolyte membrane in the fuel cell. The gas diffusion layer functions to supply reactant gases such as hydrogen and air, transmit electrons produced by the electrochemical reaction, and discharge water produced by the reaction to minimize the flooding phenomenon in the fuel cell [L. Cindrella, A. M. Kannan, J. F. Lin, K. Saminathan, Y. Ho, C. W. Lin, J. Wertz, J. Power Sources, 194, 146 (2009); X. L. Wang, H. M. Zhang, J. L. Zhang, H. F. Xu, Z. Q. Tian, J. Chen, H. X. Zhong, Y. M. Liang, B. L. Yi, Electrochim. Acta, 51, 4909 (2006)].

Especially, in order to increase the mass transport and maintain high cell performance by effectively removing the water produced during the electrochemical reaction of the fuel cell, it is very important to impart hydrophobicity to the microporous layer and the macroporous substrate by appropriately introducing a hydrophobic agent such as polytetrafluoroethylene (PTFE) into them [S. Park, J.-W. Lee, B. N. Popov, J. Power Sources, 177, 457 (2008); G.-G. Park. Y. J.-Sohn, T. H. Yang, Y.-G. Yoon, W.-Y. Lee, C. S. Kim, J. Power Sources, 131, 182(2004)].

However, a wet chemical process has conventionally been used to impart hydrophobicity, and thus the manufacturing process itself is complicated and it is difficult to uniformly distribute the hydrophobic agent such as PTTE on the gas diffusion layer.

Moreover, according to the conventional process for manufacturing the gas diffusion layer, it is difficult to further impart high hydrophobicity or super-hydrophobicity corresponding to a contact angle (static constant angle) of 150° or more to a porous medium which have already been subjected to waterproof treatment.

In conventional studies, there have been various attempts to impart hydrophilicity to the surface of the porous medium using various plasma processes such as oxygen, nitrogen, ammonia, silane ($SiH_4$), organometallics, etc. [D. R. Mekala, D. W. Stegink, M. M. David, J. W. Frisk, US 2005/0064275 A1 (2005); Korean Patent Publication No. 10-2006-0090668 (2006)], which, however, are different from the object of the present invention to impart high hydrophobicity to the porous medium.

In addition, there have been attempts to employ plasma surface treatment techniques during manufacturing of the electrodes of the MEA [G. H. Nam, S. I. Han, Korean Patent Publication No. 10-2009-0055301 (2009); M. G. Min, G. S. Chae, S. G. Kang, Korean Patent No. 10-0839372 (2008); W. M. Lee, 1, G. Goo, J. H. Sim, Korean Patent No. 10-0681169 (2007); H. T. Kim, H. J. Kwon, Korean Patent No. 10-0599799 (2006)], which, however, relate to a process for forming a catalyst layer comprising a catalyst and a binder. That is, these methods are to chemically form a hydrophilic or hydrophobic surface by modifying the surface of the catalyst layer using plasma techniques, and with these methods, there are limitations in forming high hydrophobicity on the surface of the porous medium.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for increasing hydrophobicity on the surface of a porous medium, which can be effectively used in a fuel cell.

In one aspect, the present invention provides a porous medium with increased hydrophobicity. This porous medium includes a micro-nano dual structure, in which nanometer-scale protrusions or collapsed pores are formed on the surface of the porous medium with a micrometer-scale surface roughness, and a hydrophobic thin film deposited on the surface of the micro-nano dual structure.

In another aspect, the present invention provides a method of manufacturing a porous medium with increased hydrophobicity. This method includes providing a porous medium having a micrometer-scale surface roughness; forming a micro-nano dual structure on the surface of the porous medium by forming nanometer-scale protrusions or collapsed pores by plasma etching; and depositing a hydrophobic thin film on the surface of the micro-nano dual structure.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle, is a vehicle that has two or more sources of power, for example both gasoline-powered and electric-powered vehicles.

The above and other features of the invention are discussed infra.

The present invention provides a porous medium (PM) used in a fuel cell and a method of manufacturing the same, the porous medium having an increased hydrophobic surface.

Especially, the highly hydrophobic porous medium of the present invention has the surface of a micro-nano dual structure in which nanoprotrusions or collapsed nanopores are formed on the surface of the porous medium with a micrometer-scale surface roughness (a macroporous substrate, which will be described later, has a micrometer-scale surface roughness) and, at the same time, a hydrophobic thin film is deposited on the surface of the micro-nano dual structure, thereby increasing hydrophobicity due to the micro-nano dual structure and the hydrophobic thin film.

In the following, the micro-nano dual structure represents a composite structure which includes microstructures and nanostructures in which nanoprotrusions or collapsed nanopores are artificially formed by a plasma etching treatment on the surface of the porous medium with an intrinsic micrometer-scale roughness.

Since the macroporous substrate has a micrometer-scale surface roughness, the micrometer-scale surface protrusions or collapsed pores thereof form the micro-nano dual structure together with the artificially formed nanoprotrusions or nanopores.

Moreover, carbon particles of the microporous layer also have a fine surface roughness, and thus when the nanoprotrusions or nanopores are formed on the microporous layer by the plasma etching treatment, the nanostructures by the plasma etching treatment form a dual structure on the microporous layer together with the carbon particles.

The surface roughness is given by the nanoprotrusions or collapsed nanopores formed on the surface of the material for the porous medium (corresponding to the carbon particles of the microporous layer or carbon fibers of the macroporous substrate).

As a result, the highly hydrophobic porous medium with the micro-nano dual structure of the present invention has features that the wettability on both (outer) surfaces is significantly lower than that of the conventional porous media and the contact angle (i.e., static contact angle) of a fluid such as pure water on the surface of the porous medium is 150° or higher, which will be described in detail later.

Moreover, to overcome the limitations in achieving high hydrophobicity in the conventional process for manufacturing the porous medium, high hydrophobicity is imparted to the surface of the porous medium such as the gas diffusion layer (i.e., the surface of the microporous layer and the surface of the macroporous substrate) by both structural and chemical modifications in the manufacturing process of the present invention, in which a process for optimizing the nanostructures with a high aspect ratio on the surface of the porous medium, a process for structurally modifying the surface having a micro-nano dual roughness structure, and a chemical modification process for forming a chemically hydrophobic surface by depositing a hydrophobic thin film are performed in combination.

Through experimentation it has been found that when a dry plasma treatment (i.e., plasma etching treatment) is performed on the porous medium, nanoprotrusions or nanopores are formed (by the plasma etching treatment) and combined with the surface of the porous medium with a micrometer-scale surface roughness to form a micro-nano dual structure, and when a hydrophobic carbon thin film is formed on the surface of the micro-nano dual structure by plasma deposition, for example, the hydrophobicity of the porous medium can be significantly increased. The thus formed porous medium with increased hydrophobicity can be effectively used as the gas diffusion layer of the fuel cell and can be effectively used to remove water produced during the electrochemical reaction of the fuel cell.

In the process of modifying the surface of the porous medium by the plasma treatment of the present invention, the nanostructures are formed by etching the surface of the porous medium using for example argon (Ar) or oxygen plasma to provide a structure that can minimize the contact surface with a fluid such as water, and the hydrophobic thin film (e.g., hydrophobic carbon thin film) is deposited on the surface of the resulting structure. In this case, it is possible to impart high hydrophobicity or super-hydrophobicity corresponding to a contact angle of 150° or more with respect to the fluid such as pure water. That is, with the dry plasma treatment, the structural and chemical modifications are possible on the surface of the porous medium, and thus it is possible to easily impart high hydrophobicity suitable for the fuel cell.

A better understanding of the increased hydrophobicity on the surface of the porous medium can be achieved by understanding the mechanism of high hydrophobicity or super-hydrophobicity on a solid surface as described below.

The hydrophobicity of the solid surface depends on chemical properties of the solid surface, but when a fine pattern is formed on the solid surface, the hydrophobicity significantly increases such that the solid surface has super-hydrophobicity. For example, the contact angle of the surface having a fine protrusion or pore structure with respect to water is relatively large in the range of from 150° to 170° to impart super-hydrophobicity, compared to a flat surface which has been subjected to the same chemical treatment.

At the same time, the surface having the protrusion or pore structure can have a self-cleaning function, which allows a droplet on the solid surface to be readily removed under conditions where the contact angle hysteresis is reduced to less than 10°. Therefore, in order to manufacture a highly hydrophobic or super-hydrophobic surface, a surface layer having low surface energy should be formed and, at the same time, the surface layer should have a physical/structural surface roughness.

In the case of the surface roughness, the size distribution of fine protrusions or pores plays a very important role, and the surface roughness including collapsed pores also exhibits the same properties as the surface roughness including fine protrusions. Especially, if the chemical composition of the surface is controlled while the nanometer-scale pores and micrometer-scale pores are present together, a hydrophobic surface and, further, a super-hydrophobic surface can be achieved. Therefore, in the present invention, the target high hydrophobicity is achieved by implementing a mechanism for increasing the hydrophobicity, which can be obtained when the above-described structure and the chemical properties are combined together on the surface of the porous medium.

That is, the highly hydrophobic surface can be obtained by forming a nano-pattern by plasma etching and forming a hydrophobic thin film by plasma deposition on the surfaces of the microporous layer and the macroporous substrate, which constitute the porous medium such as the gas diffusion layer of the fuel cell. Moreover, it is possible to impart high hydrophobicity to the surface of the porous medium by simultaneously performing structural and chemical controls on the surface properties of the porous medium.

Figure 1:
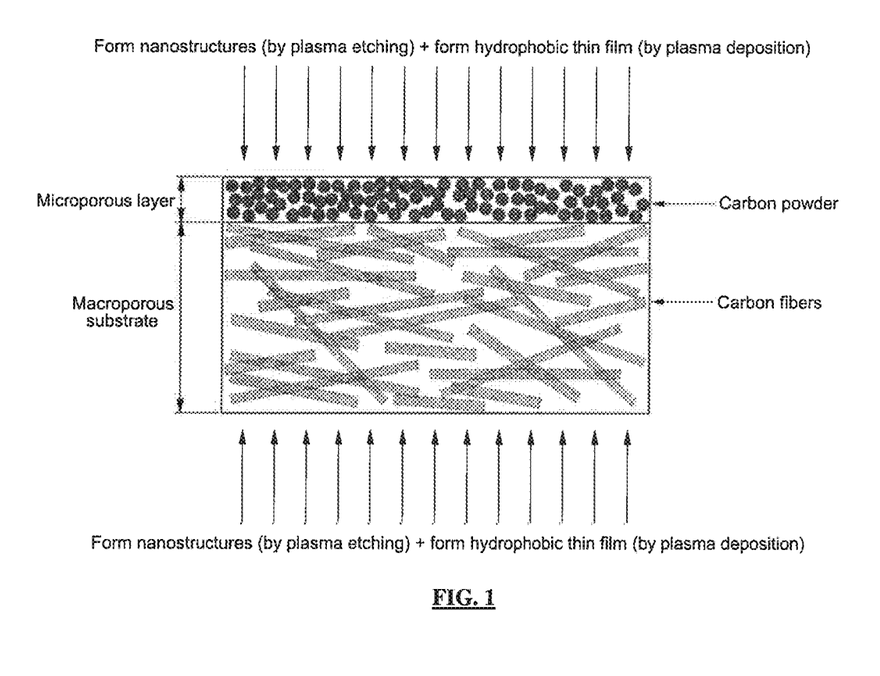
FIG. 1 is a schematic diagram showing a micro-nano composite structure formed by performing plasma etching on a porous medium according to the illustrative embodiment of the present invention.

Next, the present invention will be described in more detail with reference to the drawings. FIG. 1 is a schematic diagram showing a micro-nano composite structure formed by performing plasma etching on a porous medium according to the present invention. That is FIG. 1 schematically shows a microporous layer and a macroporous substrate, which constitute the gas diffusion layer as a typical example of the porous medium in the fuel cell, and shows a surface modification method for the porous medium according to the present invention.

The highly hydrophobic porous medium of the present invention includes nanostructures with a high aspect ratio and a hydrophobic thin film, which are provided on the surface of the microporous layer and the surface of the macroporous substrate, respectively.

As shown in FIG. 1, the plasma etching treatment for the micro-nano dual structure is performed on the surface of the microporous layer and the surface of the macroporous substrate, respectively, to form nanostructures with a high aspect ratio, and a hydrophobic thin film is formed on the micro-nano dual structure by plasma deposition, thereby manufacturing a porous medium with a highly hydrophobic surface.

The microporous layer and the macroporous substrate, which constitute the gas diffusion layer as the porous medium in the fuel cell, consist of the following materials.

Typically, the microporous layer may be formed by preparing a mixture of carbon black powder such as acetylene black carbon, black pearl carbon, etc. and a hydrophobic agent such as polytetrafluoroethylene (PTFE) or fluorinated ethylene propylene (FEP) and coating the mixture on one or both sides of the macroporous layer. The macroporous substrate generally consists of carbon fibers and a hydrophobic agent such as polytetrafluoroethylene or fluorinated ethylene propylene [C. Lim and C. Y. Wang, Electrochim. Acta, 49, 4149 (2004)] and can be broadly classified into carbon fiber felt, carbon fiber paper, and carbon fiber cloth according to its physical structure [S. Escribano, J. Blachot, J. Etheve, A. Morin, R. Mosdale, J. Power Sources, 156, 8 (2006); M. F. Mathias, J. Roth, J. Fleming, and W. Lehnert, Handbook of Fuel Cells-Fundamentals, Technology and Applications, Vol. 3, Ch. 42, John Wiley & Sons (2003)].

In the present invention, the plasma etching is performed on each surface of the porous medium having the above-described structure, in which the microporous layer and the macroporous substrate are stacked together (see FIG. 1), to form a pattern of nanoprotrusions or nanopores on the surface of carbon materials (such as carbon particles and carbon fibers), which constitute the surfaces of the microporous layer and the macroporous substrate (i.e., the surface of the porous medium).

In an illustrative embodiment, a pattern of nanoprotrusions or nanopores having a width of 1 to 100 nanometers, a length of 1 to 1,000 nanometers, and an aspect ratio of 1 to 10 may be preferably formed on the surface of the carbon materials on the surfaces of the microporous layer and the macroporous substrate by plasma etching. Here, if the aspect ratio is less than 1, the surface roughness effect is not fully established, whereas, if the aspect ratio is greater than 10, the structure of the nano-pattern is not stably maintained.

In the microporous layer, the carbon particles having non-uniform sizes form aggregates and thus are present in the range of several tens of nanometers to several micrometers. When the plasma etching treatment is performed on the microporous layer, the surfaces of spherical carbon particles are etched to form sharp carbon particles having a width of several nanometers, and the hydrophobic thin film is deposited on the surface of the resulting microporous layer.

Moreover, it is preferred to form nanoprotrusions or nanopores having a width of 10 to 30 nanometers, a length of 10 to 200 nanometers, and an aspect ratio of 1 to 7 on the surface of carbon fibers having a diameter of 5 to 20 micrometers of the macroporous substrate by plasma etching. These nanoprotrusions form a nano-pattern with a high aspect ratio, thus provide the micro-nano dual structure. Furthermore, the surface with the micro-nano dual structure has super-hydrophobic and self-cleaning properties.

The hydrophobic thin film for increasing the hydrophobicity may be a hydrocarbon thin film comprising silicon (Si) and oxygen or a hydrocarbon thin film comprising fluorine (F), and the hydrophobic thin film may have a thickness in the range of 0.1 to 90 nanometers. Here, if the thickness of the hydrophobic thin film is less than 0.1 nanometers, the effect of increasing the hydrophobicity of the porous medium cannot be obtained, whereas, if it exceeds 90 nanometers, the electrical resistance may increase significantly when the porous medium is used as the gas diffusion layer. Therefore, it is preferable that the hydrophobic thin film has a thickness in the range of 0.1 to 90 nanometers.

Especially, in order to use the porous medium as the gas diffusion layer of the fuel cell, it is necessary to properly adjust the thickness of the hydrophobic thin film so as not to clog the pores without increasing the original electrical resistance of the gas diffusion layer.

The hydrocarbon material comprising silicon and oxygen may be deposited using hexamethyldisiloxane (HMDSO) as a precursor, and the hydrophobicity may be controlled by appropriately mixing hexamethyldisiloxane and argon gas (not more than 30% volume fraction).

The contact angle on the surfaces of the microporous layer and the macroporous substrate in the porous medium whose hydrophobicity is increased by the above-described plasma treatment (for the formation of the nanostructures by plasma etching and the formation of the hydrophobic thin film by plasma deposition) is 150° or higher. Since the nanometer-scale pattern and the micrometer-scale pattern are mixed with PTFE as a hydrophobic polymer on the surfaces of the microporous layer and the macroporous substrate, which constitute the porous medium, the contact angle is about 135 to 145°.

However, in the porous medium of the present invention, the size of the nano-pattern with a high aspect ratio formed by plasma etching is significantly smaller than that of the above-described conventional surface, and the surface roughness is much larger than that of the conventional surface. Therefore, the porous medium of the present invention can have a contact angle (i.e., static constant angle) of 150° or higher and have highly hydrophobic surface properties due to the micro-nano dual structure. Especially, even the surface which is free from PTFE can have high hydrophobicity corresponding to a contact angle of 150° or higher. Moreover, the hydrophobic thin film is uniformly deposited on the surface such that the surface energy is generally low, and thus a highly uniform hydrophobic surface can be obtained.

The hydrophobic agent such as PTFE introduced into the microporous layer and the macroporous substrate of the commercially available gas diffusion layer is difficult to be uniformly introduced into the surface and the inside, and a complex wet manufacturing process should be used. Moreover, it is difficult to increase the contact angle of the surface of the porous medium above 150°.

The process for manufacturing the highly hydrophobic porous medium of the present invention includes: (a) providing a porous medium comprising only a macroporous substrate or having a structure in which a macroporous substrate and a microporous layer are combined together; (b) forming nanostructures in the form of nanoprotrusions with a high aspect ratio or collapsed nanopores on the surface of carbon materials of the porous medium; and (c) depositing a hydrophobic thin film on the surface of the porous medium on which the nanostructures are formed.

As shown in FIG. 1, step (a) is to provide a porous medium comprising only a macroporous substrate or having a structure in which a macroporous substrate and a microporous layer are combined together, and this process for manufacturing the porous medium is well known in the art. In a preferred embodiment, a commercially available porous medium for the gas diffusion layer, in which the microporous layer and the macroporous substrate are combined together, may be used.

Step (b) is to form nanostructures with a high aspect ratio by performing plasma etching on both sides of the porous medium comprising the microporous layer and the macroporous substrate on which the nanoscale and microscale surfaces are formed. The plasma etching may be plasma-enhanced chemical vapor deposition (PECVD) or plasma-assisted chemical vapor deposition (PACVD) and may use $O_2$, Ar, $N_2$, He, $CF_4$, $CHF_3$, $C_2F_6$, HF, or $SiF_4$. Moreover, besides the chemical vapor depositions (CVDs), the etching can be performed by one or a combination of ion beam, hybrid plasma chemical vapor deposition (HPCVD), and atmospheric plasma.

Figure 4A:
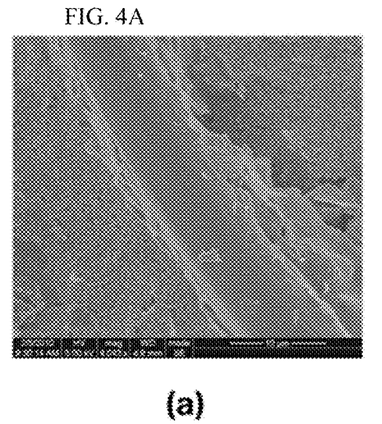
FIGS. 4A and 4B are SEM images showing the surface of a macroporous substrate before and after oxygen plasma etching according to an illustrative embodiment of the present invention.
Figure 4B:
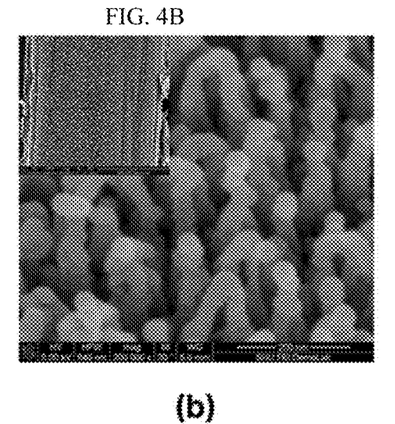

When the surface etched by the plasma etching is magnified, it can be seen that a large number of nanoprotrusions a high aspect ratios are formed, and the change in the distribution of nanoprotrusions on the surfaces of the microporous layer and the macroporous substrate can be seen from FIGS. 2 and 4.

Figure 2A:
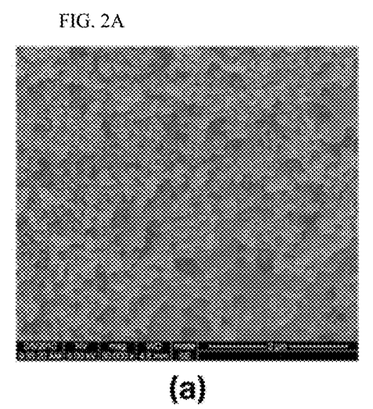
FIGS. 2A to 2D are SEM images showing the surface of a microporous layer of a gas diffusion layer before and after oxygen plasma etching and after "oxygen plasma etching+hydrophobic thin film deposition" according to an illustrative embodiment of the present invention.
Figure 2B:
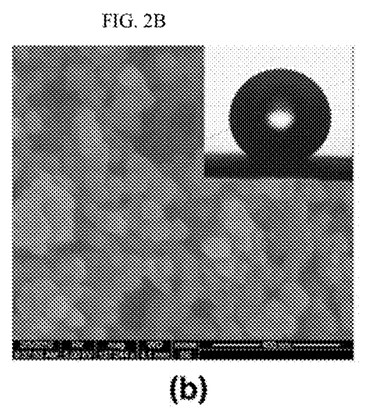
Figure 2C:
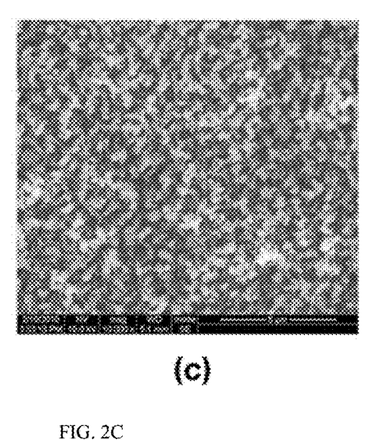
Figure 2D:
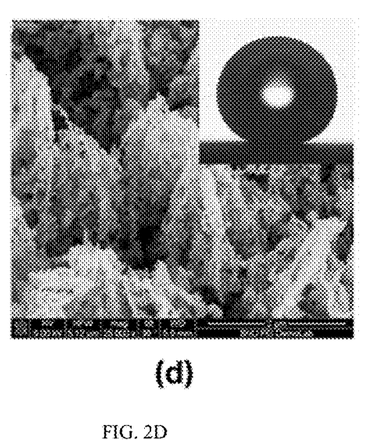

FIGS. 2A and 2B are scanning electron microscope (SEM) images showing the surface of the microporous layer before oxygen plasma etching, and FIG. 2C is an SEM image showing the surface of the microporous layer etched by oxygen plasma. Moreover, FIG. 2D is an SEM image showing the surface on which the hydrophobic thin film is finally deposited on the surface of the microporous layer etched by oxygen plasma.

Compared to FIGS. 2A and 2B before plasma etching treatment, it can be seen that the size of the nano-pattern is relatively reduced from about 50 nanometers to about 10 to 30 nanometers and the surface is more roughened, as shown in FIG. 2C. The oxygen plasma reacts with the carbon materials to etch the carbon particles on the surface of the microporous layer and the carbon fibers on the surface of the macroporous substrate. At this time, the carbon materials are bonded with oxygen plasma to form $CO_2$ or CO, and thus the surface is etched.

In the plasma etching process of the present invention, the size and shape of the nanostructures with a high aspect ratio can be controlled by adjusting at least one of the etching pressure, acceleration voltage, and etching time (i.e., plasma treatment time). Preferably, the etching pressure is 1 Pa to 10 Pa and the acceleration voltage is −100 Vb to −1,000 Vb.

If the etching pressure is less than 1 Pa, the formation rate of the surface roughness pattern is too low to effectively form the pattern, whereas, if it exceeds 10 Pa, the formation rate of the surface roughness pattern is too high to form a stable pattern.

Moreover, if the acceleration voltage is less than −100 Vb, the plasma cannot be efficiently generated, whereas, if it exceeds −1,000 Vb, the plasma generation process cannot be stably maintained.

Further, since the formation of nanostructures on the surface according to the plasma etching time may have a significant effect on the performance of the fuel cell, it is important to perform the plasma irradiation for an optimum time, and thus the plasma etching is preferably performed for 0.1 to 60 minutes.

If the plasma etching time is less than 0.1 minutes, the etching effect is too small to allow the nanostructures to develop, whereas, if it exceeds 60 minutes, it is difficult to control the surface shape of desired nanostructures due to excessive etching, and further the cycle of the surface treatment is too long, thus reducing the productivity.

Step (c) is to deposit a hydrophobic thin film on the surface of the porous medium on which a composite pore structure comprising micropores and nanopores is formed. To deposit the hydrophobic thin film, a mixed gas of argon (in the range of 0 to 30 vol %) and hexamethyldisiloxane or hexamethyldisiloxane gas may be used.

The surface properties of the hydrophobic thin film for increasing the hydrophobicity depend on a radio frequency (RF) power supply and an argon fraction in a PECVD apparatus.

Therefore, if the RF power supply and the argon fraction in the precursor gas are properly controlled, it is possible to control the hydrophobic properties and achieve an improved thin film.

Next, Examples of the present invention will be described in detail with reference to the drawings.

A process of manufacturing a highly hydrophobic porous medium on the surface of the microporous layer and the macroporous substrate, which constitute the gas diffusion layer as a typical example of the porous medium in the fuel cell, will be described in the following Examples 1 and 2, but the present invention is not limited thereto.

Example 1: Material for Microporous Layer with Increased Hydrophobicity

First, a commercially available gas diffusion layer material, which includes a microporous layer comprising carbon powder having a diameter of 10 to 300 nanometers and PTFE and a macroporous substrate comprising carbon fibers in the form of felt and PTFE, was used. However, a gas diffusion layer material with a macroporous substrate comprising only carbon fibers without a hydrophobic material such as PTFE may be applied to the present invention. The size of carbon particles forming the microporous layer in the gas diffusion layer material is not uniform and lies in the range of 10 to 300 nanometers.

The basic properties and characteristics of the gas diffusion layer used in this Example of the present invention are shown in Table 1. The entire thickness of the porous medium (i.e., gas diffusion layer) was obtained by the measurement of at least 20 times using a Mitutoyo thickness gauge (Mitutoyo Co., Japan).

The weight per unit area of the porous medium was obtained by the measurement of at least 20 times using a digital scale (A&D Company, Japan), and the air permeability of the porous medium was measured at least 5 times under conditions of 0.3 kPa using the Gurley method.

TABLE 1

| Thickness of GDL (μm) | Type of macroporous substrate | Presence or absence of microporous layer | Weight per unit area of GDL (g/m$^2$) | Air permeability [cm$^3$/(cm$^2$ · s)] |
|---|---|---|---|---|
| 426 ± 10 | Carbon fiber felt | Present | 135 ± 2 | 3.2 ± 1.6 |

FIGS. 2A and 2B are low- and high-magnification images of the surface of the microporous layer before oxygen plasma etching in this Example.

The surface of a prepared microporous layer was subjected to oxygen plasma etching treatment using RF-PECVD, and the oxygen plasma etching was performed under conditions where only oxygen was used as gas, the etching pressure was 10 Pa, and the RF voltage was −100 Vb to −800 Vb.

The oxygen plasma reacts with the carbon materials to etch the carbon particles on the surface of the microporous layer and, at this time, the carbon materials are bonded with oxygen plasma to form $CO_2$ or CO, thus etching the surface of the microporous layer.

Especially, the surfaces of spherical particles having a size of several tens to several hundreds of nanometers, which constitute the microporous layer, are etched to form sharp carbon particles having a width of 10 to 20 nanometers.

Figure 3:
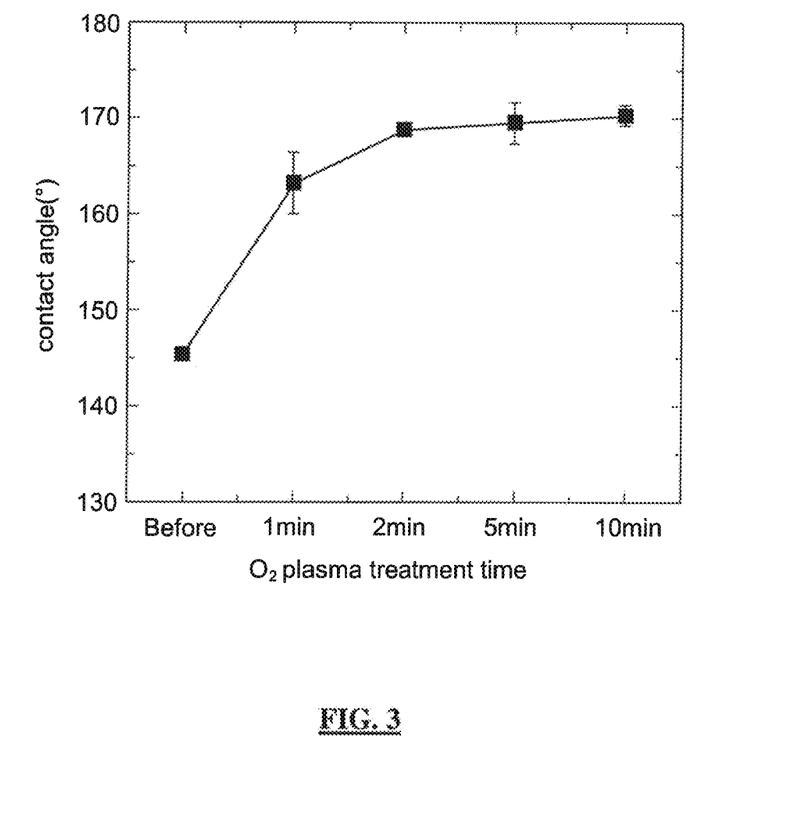
FIG. 3 is a graph showing the change in the contact angle of a droplet on the surface of a microporous layer while varying oxygen plasma etching time.

FIG. 3 is a graph showing the change in the contact angle of a droplet on the surface of the microporous layer while varying oxygen plasma etching time. As shown in FIG. 3, if the oxygen plasma etching time varies to 1, 2, 5 to 10 minutes at a voltage of −400 Vb during the plasma etching, the width of nanoparticles on the surface is reduced to 10 to 20 nanometers, and the shape of the nanoparticles is changed into nanoprotrusions having a length of 10 to 50 nanometers. As a result, the carbon nanoparticles are changed into nanoprotrusions, and thus the surface roughness increases.

Then, a hydrophobic thin film comprising silicon and oxygen was deposited on the surface of the thus formed carbon nanoprotrusions to increase the hydrophobicity.

The hydrophobic thin film was deposited from HMDSO by 13.56 MHz RF-PECVD, in which the fraction of argon gas in the precursor gas was maintained at 0 vol % and the RF power source was fixed to −400 Vb. The deposited hydrophobic thin film had a uniform thickness of about 10 nm, and the pressure in a chamber was 5 Pa. The properties of the microporous layer in the hydrophobic porous medium formed in the present Example were analyzed and the results are as follows.

As shown in FIG. 2, the surface of the microporous layer formed in Example 1 has a structure in which a hydrophobic thin film is deposited on the surface having nanoprotrusions. The contact angle on the hydrophobic surface having the above-described structure is 150° or more as shown in FIG.

2D, and the contact angle can be controlled according to the deposition conditions of the hydrophobic thin film.

The measurement of the contact angle was performed using a goniometer (Data Physics Instrument GmbH, OCA 20 L), and this instrument makes it possible to acquire the optical image and contact angle of a sessile droplet on the surface. The "contact angle" used for convenience in the present invention means the "static contact angle." The contact angle (i.e., static contact angle) was measured by gently landing a 5 ml droplet on the surface.

Referring to FIG. 3 showing the contact state of the droplet on the surface of the microporous layer, the static contact angle on the surface of the microporous layer before etching is about 145°. However, when the nanoprotrusions are formed on the surface and the hydrophobic thin film is deposited thereon, the contact angle is increased to about 160 to 170° according to the oxygen plasma treatment time, and thus the surface has super-hydrophobicity.

As a result, according to the above-described manufacturing method, it is possible to provide a highly hydrophobic microporous layer and, since the surface of the microporous layer has a self-cleaning function and a water-repellent function, the porous medium with the above-described microporous layer can be advantageously used as a material for maintaining the performance of the fuel cell by efficiently discharging water produced during the electrochemical reaction of the fuel cell.

Example 2: Material for Macroporous Substrate with Increased Hydrophobicity

The macroporous substrate on the other side (see FIG. 1) of the porous medium comprises carbon fibers in the form of felt and PTFE as a porous material interposed between the carbon fibers. Therefore, the contact angle of the macroporous substrate itself with respect to a droplet is about 135 to 145°. Moreover, the contact angle of the macroporous substrate is similar to that of the intrinsic microporous layer. The carbon fibers, which constitute the macroporous substrate, are provided in the form of felt, and the diameter of the carbon fibers are in the range of about 5 to 20 micrometers.

First, the surface of a prepared macroporous substrate was subjected to oxygen plasma etching treatment using RF-PECVD, and the oxygen plasma etching was performed under conditions where only oxygen was used as gas, the etching pressure was 10 Pa, and the RF voltage was −100 Vb to −800 Vb.

The oxygen plasma reacts with the carbon materials to etch the carbon fibers on the surface of the macroporous substrate and, at this time, the carbon materials are bonded with oxygen plasma to form $CO_2$ or CO, thus etching the surface of the macroporous substrate. The shapes of the surface before and after the plasma etching are shown in FIGS. 4A and 4B, respectively, from which it can be seen that nanoprotrusions with a high aspect ratio are formed on the surface of the micrometer-scale carbon fibers after the plasma etching, thus forming a micro-nano dual structure.

Figure 5:
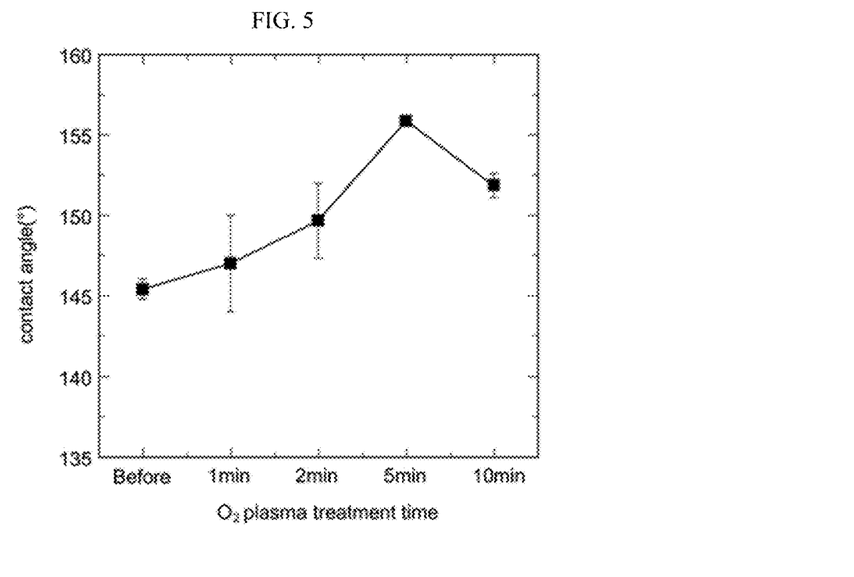
FIG. 5 is a graph showing the change in the contact angle of a droplet on the surface of a macroporous substrate while varying oxygen plasma etching time.

FIG. 5 is a graph showing the change in the contact angle of a droplet on the surface of the macroporous substrate while varying oxygen plasma etching time. As shown in FIG. 5, if the oxygen plasma etching time varies to 1, 2, 5 to 10 minutes at a voltage of −400 Vb during the plasma etching, nanoprotrusions are formed on the surface of the carbon fibers and the surface of PTFE between the carbon fibers.

Here, the protrusions have a width of 10 to 30 nanometers and a length of 10 to 200 nanometers, thus having an aspect ratio of 1 to 7. As a result, the carbon fibers having a diameter of 5 to 20 micrometers and the nanoprotrusions with a high aspect ratio formed thereon form a micro-nano dual protrusion structure, thereby providing a surface with a micro-nano dual (composite) structure. This surface has super-hydrophobic and self-cleaning properties, thus providing the super-hydrophobicity that the present invention intends to achieve.

Then, a hydrophobic thin comprising silicon and oxygen for increasing the hydrophobicity was deposited on the macroporous substrate comprising the dual protrusion structure of the surface of the carbon fibers comprising the thus formed nanoprotrusions and the surface of PTFE. In this process, the hydrophobic thin film was deposited from HMDSO by 13.56 MHz RF-PECVD, in which the fraction of argon gas in the precursor gas was maintained at 0 vol % and the RF power source was fixed to −400 Vb. The deposited hydrophobic thin film had a uniform thickness of about 10 nm, and the pressure in a chamber was 5 Pa. The properties of the macroporous substrate in the hydrophobic porous medium formed in the present Example were analyzed and the results are as follows.

As shown in FIG. 4, the surface of the macroporous substrate formed in Example 2 has a structure in which a hydrophobic thin film is deposited on the surface of carbon fibers comprising nanoprotrusions and the surface of PTFE.

In this structure, the contact angle on the surface of the hydrophobic porous medium is 150° or more as shown in FIG. 5, and the contact angle can be controlled according to the plasma etching conditions and the deposition conditions of the hydrophobic carbon thin film.

The measurement of the contact angle was performed using the goniometer in Example 1, and this instrument makes it possible to acquire the optical image and contact angle of a sessile droplet on the surface. The static contact angle was measured by gently landing a 5 ml droplet on the surface.

As shown in FIG. 5, the static contact angle on the surface of the macroporous substrate itself is about 145°. However, when the nanoprotrusions are formed on the surface and the hydrophobic carbon thin film is deposited on the surface, the macroporous substrate has super-hydrophobicity corresponding to a static contact angle of more than 155°, and the static contact angle varies according to the oxygen plasma treatment time.

As a result, according to the above-described manufacturing method, it is possible to provide a highly hydrophobic macroporous substrate and, since the surface of the macroporous substrate has a self-cleaning function and a water-repellent function, the porous medium with the above-described macroporous substrate can be advantageously used as a material for maintaining the performance of the fuel cell by efficiently discharging water produced during the electrochemical reaction of the fuel cell.

As such, according to the manufacturing method of the present invention, it is possible to significantly increase the hydrophobic properties of the surfaces of the microporous layer and the macroporous substrate, thus providing the highly hydrophobic porous medium.

Especially, according to the process of the present invention for increasing the hydrophobic properties of the surfaces of the microporous layer and the macroporous substrate, it is possible to significantly increase the hydrophobic properties of the gas diffusion layer comprising the microporous layer and the macroporous substrate.

As described above, the contact angle is significantly increased on the surface of the highly hydrophobic porous medium according to the present invention, and thus the porous medium of the present invention has super-hydrophobic surface properties. This super-hydrophobic surface has a self-cleaning function and a water-repellent function. Therefore, the highly hydrophobic porous medium according to the present invention can be advantageously used as a fuel cell porous medium such as the gas diffusion layer and efficiently discharge water produced during the electrochemical reaction of the fuel cell, thus maintaining high performance of the fuel cell.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A porous medium with increased hydrophobicity, the porous medium comprising
    a micro-nano dual structure, in which nanometer-scale protrusions or collapsed pores are formed on the surface of the porous medium with a micrometer-scale surface roughness, wherein the porous medium includes a macroporous substrate containing carbon fibers and a microporous layer containing carbon particles; and
    a hydrophobic thin film deposited on the surface of the micro-nano dual structure,
    wherein the nanometer-scale protrusions and/or the nanometer-scale collapsed pores are formed within surfaces of the carbon particles and/or within surfaces of the carbon fibers,
    wherein a plasma etching is carried out at an etching pressure of 1 Pa to 10 Pa to form the nanometer-scale protrusions and/or the nanometer-scale collapsed pores within surfaces of the carbon particles to provide sharp carbon particles.

2. The porous medium of claim 1, wherein the porous medium comprises only a macroporous substrate or both a macroporous substrate and a microporous layer coated on the macroporous substrate.

3. The porous medium of claim 2, wherein the macroporous substrate comprises a micro-nano dual structure in which nanoprotrusions or nanopores having a width of 10 to 30 nanometers, a length of 10 to 200 nanometers, and an aspect ratio of 1 to 7 are formed on the surface of carbon fibers having a diameter of 5 to 20 micrometers.

4. The porous medium of claim 1, wherein the nanoprotrusions or nanopores have a width of 1 to 100 nanometers, a length of 1 to 1,000 nanometers, and an aspect ratio of 1 to 10.

5. The porous medium of claim 1, wherein the hydrophobic thin film is a hydrocarbon thin film.

6. The porous medium of claim 5, wherein the hydrophobic thin film is a hydrocarbon thin film comprising silicon and oxygen or a hydrocarbon thin film comprising fluorine.

7. The porous medium of claim 1, wherein the hydrophobic thin film has a thickness of 0.1 to 90 nanometers.

8. The porous medium of claim 1, wherein the surface on which the hydrophobic thin film is formed has a static contact angle of 150 degrees or higher.

9. The porous medium of claim 1, wherein the carbon particles are generally spherical particles prior to the plasma etching.

10. The porous medium of claim 9, wherein the generally spherical particles have non-uniform sizes and are in the form of aggregates in the microporous layer ranging in size from about several tens to several hundreds of nanometers, and wherein the plasma etching etches surfaces of the spherical carbon particles to form sharp carbon particles having a width of about 10-20 nanometers.

11. The porous medium of claim 1, wherein the carbon fibers have a diameter of about 5-20 micrometers prior to the plasma etching, and wherein the plasma etching is carried out to form the nanometer-scale protrusions and/or the nanometer-scale collapsed pores within surfaces of the carbon fibers having an aspect ratio of 1 to 7.

12. The porous medium of claim 11, wherein the nanometer-scale protrusions and/or nanometer-scale collapsed pores have a width of about 10-30 nanometers and a length of about 10-200 nm.

13. A porous medium with increased hydrophobicity, the porous medium comprising:
    a micro-nano dual structure, in which nanometer-scale protrusions or collapsed pores are formed on the surface of the porous medium with a micrometer-scale surface roughness, wherein the porous medium includes a macroporous substrate containing carbon fibers and a microporous layer containing carbon particles; and
    a hydrophobic thin film deposited on the surface of the micro-nano dual structure,
    wherein the nanometer-scale protrusions and/or the nanometer-scale collapsed pores are formed within surfaces of the carbon particles and/or within surfaces of the carbon fibers,
    wherein a plasma etching is carried out at an etching pressure 1 Pa to 10 Pa to form the nanometer-scale protrusions and/or the nanometer-scale collapsed pores within surfaces of the carbon particles to provide sharp carbon particles,
    wherein the porous medium comprises only a macroporous substrate or both a macroporous substrate and a microporous layer coated on the macroporous substrate, and
    wherein the macroporous substrate comprises a micro-nano dual structure in which nanoprotrusions or nanopores having a width of 10 to 30 nanometers, a length of 10 to 200 nanometers, and an aspect ratio of 1 to 7 are formed on the surface of carbon fibers having a diameter of 5 to 20 micrometers.

* * * * *